United States Patent [19]

Wells, Jr.

[11] 4,317,262

[45] Mar. 2, 1982

[54] RELEASABLE CABLE CLAMP

[75] Inventor: Peter M. Wells, Jr., Sycamore, Ill.

[73] Assignee: Ideal Industries, Inc., Sycamore, Ill.

[21] Appl. No.: 75,191

[22] Filed: Sep. 12, 1979

[51] Int. Cl.³ .......................... B65D 67/02; F16L 3/08
[52] U.S. Cl. ............................... 24/16 PB; 24/17 AP; 248/74 PB
[58] Field of Search ........... 24/16 PB, 17 AP, 73 PB, 24/73 SA, 73 AP; 248/74 PB; 292/321, 322

[56] References Cited

U.S. PATENT DOCUMENTS

| | | | |
|---|---|---|---|
| 3,086,265 | 4/1963 | Orenick et al. | 24/16 PB |
| 3,088,702 | 5/1963 | Orenick et al. | 24/73 PB |
| 3,090,826 | 5/1963 | Cochran | 24/73 AP |
| 3,157,377 | 11/1964 | Orenick | 24/73 PB |
| 3,475,716 | 10/1969 | Laig | 24/16 PB |
| 3,516,631 | 6/1970 | Santucci | 24/73 AP |
| 3,517,702 | 6/1970 | Mueller et al. | 24/16 PB |
| 3,529,795 | 9/1970 | Van Niel | 248/74 PB |
| 3,542,321 | 11/1970 | Kahabka | 24/16 PB |
| 3,900,923 | 8/1975 | Thomas | 24/16 PB |
| 3,942,750 | 3/1976 | Noorily | 24/16 PB |
| 3,954,238 | 5/1976 | Nivet | 248/74 PB |

FOREIGN PATENT DOCUMENTS

| | | | |
|---|---|---|---|
| 1228109 | 1/1962 | Fed. Rep. of Germany | 24/73 AP |
| 7601536 | 2/1976 | Netherlands | 248/74 PB |
| 1345011 | 1/1974 | United Kingdom | 248/74 PB |

*Primary Examiner*—Victor N. Sakran
*Attorney, Agent, or Firm*—Kinzer, Plyer, Dorn & McEachran

[57] ABSTRACT

A releasable cable clamp having a base which can be affixed to a work surface. The base comprises a planar member and an upright pedestal. Connected to the pedestal is a strap which extends therefrom in a generally arcuate manner forming a cable-securing loop. The strap has a catch formed near one end. The catch operates in conjunction with a closure device to close and lock the clamp. A releasing latch is connected to the closure device. The latch and strap have an interlock feature which becomes engaged when the clamp is closed. Actuating the releasing latch causes the strap to be moved such that the catch is disengaged from the closure device, allowing the clamp to open.

11 Claims, 4 Drawing Figures

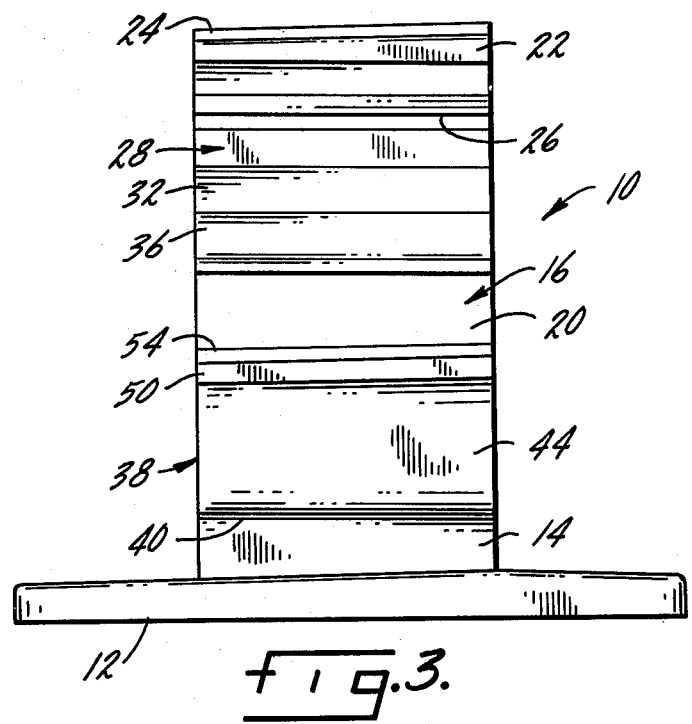
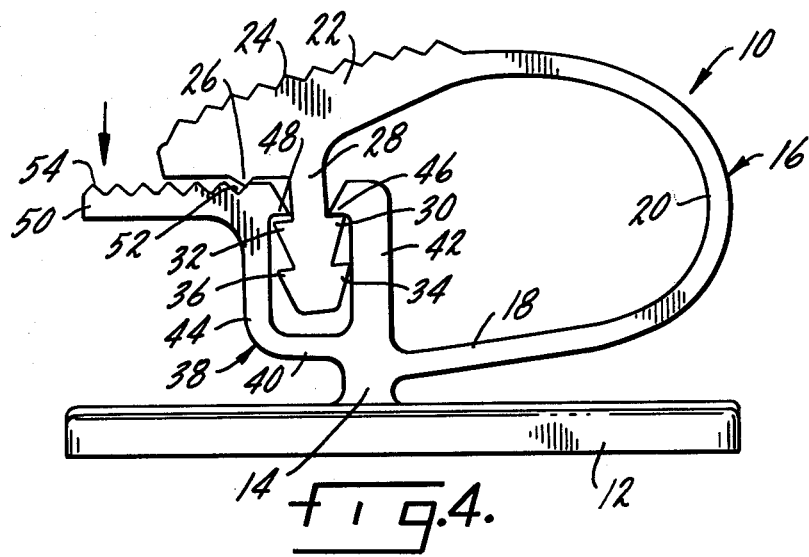

RELEASABLE CABLE CLAMP

SUMMARY OF THE INVENTION

This invention is concerned with a cable clamp having a closure which is secure when closed but which can be opened by a simple action when so desired.

Accordingly, a primary object of the present invention is to provide a cable clamp having a closure which releases on a simple pressing action by the user.

Another object is a cable clamp which requires the use of only one hand to release it.

Another object is a releasable cable clamp which is secure when in the closed position.

Another object is a releasable cable clamp which has a reduced tendency to work itself loose from its supporting surface.

Another object is a releasable cable clamp which can be closed by a simple pushing action on its strap.

Another object is a releasable cable clamp which can be made entirely of plastic.

Other objects will appear from time to time in the following specification and claims.

BRIEF DESCRIPTION OF THE DRAWINGS

FIG. 3 is an end elevation view of the cable clamp.

FIG. 4 is a side elevation view of the cable clamp shown in the closed position.

DETAILED DESCRIPTION OF THE INVENTION

Figure 1:
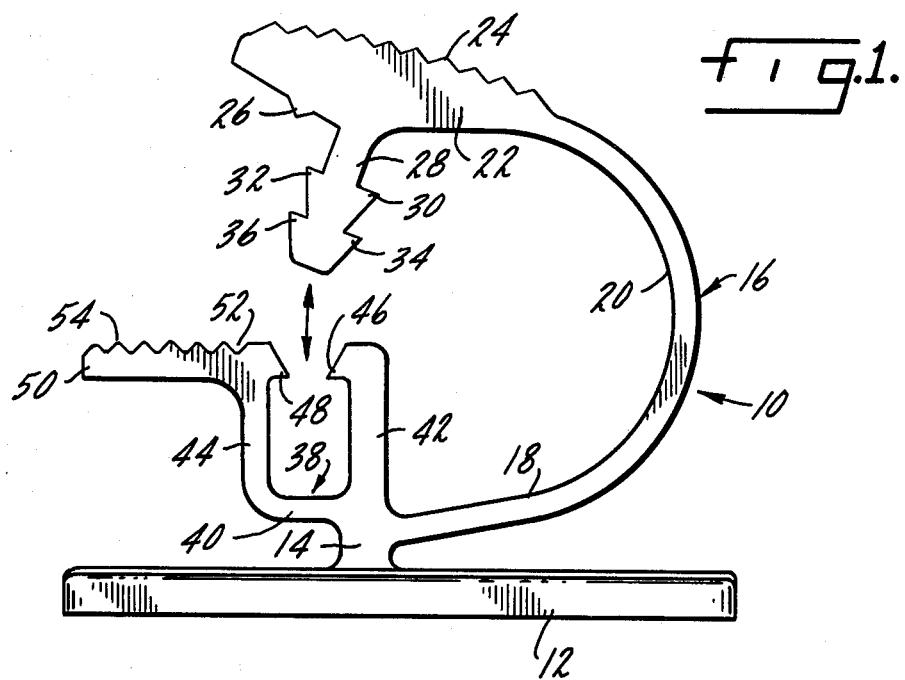
FIG. 1 is a side elevation view of a cable clamp according to the present invention, shown in the open position.
Figure 2:
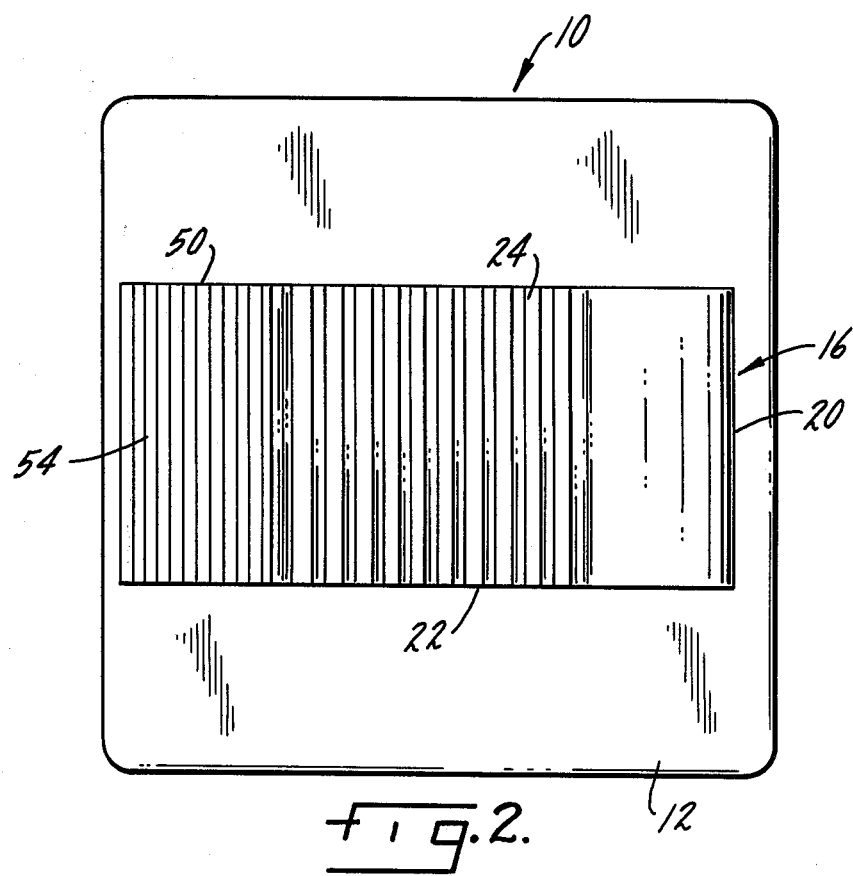
FIG. 2 is a plan view of the cable clamp.

This invention is concerned with a releasable cable clamp. Clamps of this type have been found particularly useful in wiring harness boards. When putting together a wiring harness an electrician needs a cable clamp which will preliminarily hold a cable or group of cables in place while work continues elsewhere. Frequently, the electrician will find it necessary to add additional cable to a routing which already contains previously emplaced cables. This can be done conveniently if it is possible to open the cable clamps along this route to make the additions necessary. This procedure might be repeated several times in the course of preparing a wiring harness.

It can be seen that it would be most advantageous to the electrician to be able to open and close the cable clamps with one hand, leaving the other hand free to manipulate cables, tools and the like. Similarly, it is highly desirable to have a clamp which can be closed by a simple pressing action which does not require any guiding or inserting of clamp parts.

FIGS. 1–4 show a cable clamp 10 according to the present invention. The clamp has a base including a flat portion 12 and a pedestal 14. The flat portion serves as an attachment element. It is attached to the harness board or work surface by suitable fastening means. Such means could include screw-type fasteners or other mechanical attachment members. However, in a preferred embodiment, the underside of the flat portion or attachment element 12 will be coated with a pressure-sensitive adhesive material (not shown). This permits the clamp to be attached to a harness board as required with no special mounting holes being required. The pedestal 14 is a single, upraised member connected to the flat portion 12 of the base. It is the only connection made directly to the flat portion 12.

A strap 16 extends from a side of the pedestal 14 in a generally arcuate manner to form cable-securing loop. The strap includes a first, tangential portion 18, a second arcuate portion 20, and a head portion 22. The first portion 18 is attached at one end to the pedestal 14. It then extends outwardly and upwardly at a slight angle to the flat portion 12 of the base. The first portion 18 is tangential to the arcuate portion 20. The head 22 of the strap may have a serrated surface 24 on its outer side. The head portion of the strap also includes an interlock means or rib 26. Depending from the underside of the head portion of the strap is a catch 28. The catch is disposed at an angle so it will present itself directly into a closure device when the user presses on the serrated surface 24 of the strap. Interlocking means in the form of a first locking hook 30 and a second locking hook 32 are provided on the catch 28. Provision of an auxiliary pair of locking hooks 34 and 36 afford some adjustability in the tightness of the clamp about the cable.

A closure device 38 is connected to the top of the pedestal 14. The closure device has a bottom wall 40 integrally formed with the pedestal 14. The closure further includes first and second walls 42 and 44, respectively. The first wall 42 merges into the top of the pedestal 14 and with the top surface of the bottom wall 40. The second wall 44 emerges in a smooth contour from the bottom wall 40. At the top of the side walls 42 and 44 are first and second locking hooks 46 and 48, respectively. The locking hooks have angled surfaces to match those of the notches of the catch 28. A releasing latch 50 is integrally formed near the top outside edge of the second side wall 44. The top surface of the releasing latch includes an interlock means or groove 52. The remainder of the releasing latch may have a serrated surface 54 similar to that of the head portion of the strap.

The use, operation and function of the invention are as follows:

The clamp is shown in the open position in FIG. 1. To insert a cable, the user lifts the strap 16 until the separation between the catch 28 and the closure device 38 is sufficient to allow the cable to slip into the area enclosed by the strap. Once the cable is positioned within the clamp, the clamp is closed by pushing down on the head portion 24 of the strap 16. As noted above, the curvature of the strap and the angle of the catch 28 with respect to the strap are selected so that the catch will descend into the opening between the first and second locking hooks 46 and 48 of the closure device 38. As the auxiliary notches 34 and 36 come into contact with the locking hooks, the side walls 42 and 44 will flex outwardly slightly to permit passage of the notches. Once the auxiliary notches slip past the hooks the side walls will snap back with the hooks and notches engaging in an interlocking position. To fully close the clamp, the user may then push the strap down until the first and second notches 30 and 32 snap into place in the closure device.

The cable clamp is shown in a closed position in FIG. 4. The catch 28 is held within the closure device 38 with the first and second locking hooks 46 and 48 engaging the first and second notches 30 and 32 of the inner notch pair. It can be seen that in the fully closed position the interlock means 26 of the strap 16 mates with the interlock means 52 of the releasing latch. When the user wishes to open the clamp, he depresses the releasing latch 50 in the direction of the arrow. This causes the second wall 44 and the bottom wall 40 of the closure device 38 to flex outwardly. As the side wall flexes, the strap is moved leftwardly, as seen in FIG. 4, due to the engagement of the interlock means. This pulls the first notch 30 out of engagement from the first locking hook 46. At the same time the flexing of the side wall 44 causes the second locking hook 48 to disengage from the second notch 32. This action allows the clamp to open. Thus, a simple downward motion on the releasing latch allows the user to open the clamp. There is no requirement that the user simultaneously depress the releasing latch and lift the head of the strap. It will also be noted that the releasing means of the present invention allows the catch to have notches on both sides of its surface. This provides a more positive closure and prevents inadvertent opening of the clamp. The releasing means nevertheless is able to disengage both sides of the catch when so desired.

It will be understood that the auxiliary notches 34 and 36 are not essential to a workable clamp according to this invention. However, inclusion of the auxiliary notches does provide an extra locking position, increasing the holding capacity of the clamp. If the auxiliary notches are included, the configuration of the strap 16 and catch 28 becomes critical in assuring proper releasing of the clamp. When the clamp is partially but not fully closed (i.e. the auxiliary notches engage the hooks 46 and 48) the rib 26 does not engage the groove 52. So the interlock means is not available to pull notch 34 out of engagement with hook 46. Instead, the resiliency and "memory" of the strap are relied upon. FIG. 1 approximates the relaxed position of the clamp. Closing the clamp induces stresses in the strap which urge it toward the relaxed position. The arrow in FIG. 1 indicates the general path the catch will take upon opening and closing of the clamp.

The configuration of the strap and catch are such that the natural arcuate path of the notch 34 is not intersected by hook 46. However, when the clamp is closed in the auxiliary position, the hook 46 and notch 34 are brought into engagement due to the side wall 44 and notch 48 urging the catch 28 toward the side wall 42. But when the pressure from the side wall 44 is released by depressing latch 50, the resiliency of the strap causes the notch 34 to pop out and off the hook 46. Thus the clamp can be opened from the auxiliary closed position despite non-engagement of the interlock means 26 and 52.

When the clamp is fully closed (i.e. notches 30 and 32 engaging the hooks), the natural springing action of the strap is insufficient to assure release of notch 30. The reason for this is the location of notch 30 close to the head 22 gives it a natural arcuate path that is intersected by hook 46. So the interlock means is necessary to pull the notch 30 off of hook 46. Once that is done, the natural tendency of the strap to spring away from the side wall 42 allows the auxiliary notch 34 to clear the hook 46 as the clamp opens.

Another important feature of the present invention is the single pedestal mounting of the clamp parts onto the flat portion or attachment element 12 of the base. This is important if the base is attached to the work surface by adhesive material. The single pedestal mounting arrangement affords maximum flexibility in the strap 16. For a given material, the flexibility of the strap depends on its unencumbered length. Attachment of the strap to the pedestal along one end only allows maximum free strap length for a given size clamp. This increased flexibility results in reduced stress on the pedestal which in turn reduces the stresses on the adhesive material. Furthermore, the single pedestal design reduces stress on the clamp base by removing the possibility of creating large moment arms during opening and closing of the clamp. Any twisting forces which may tend to lift the edges of the base are transmitted to the center of the base where they are most readily resisted.

The clamp may be made as an injection molding of a suitably flexible plastic material. Nylon has been found to possess the desired characteristics. It will be understood however that other manufacturing processes and materials could be used to make the clamp according to the present invention.

It will be realized where as a practical and operable device has been shown and described, nevertheless, changes may be made in size and shape of parts without departing from the spirit and scope of the invention. For example, the catch could have a configuration other than the two-sided arrangement shown or the interlock means of the release latch and strap could be reversed so that the protrusion is on the releasing latch with the groove being formed in the strap. It is therefore desired that the descriptions and drawings be taken in a broad sense as illustrative and diagrammatic rather than as limiting the invention to the specific showing.

What is claimed is:

1. In a releasable cable clamp of the type having a base, a closure device connected to the base, a strap connected to the base and extending in a generally arcuate manner to form a cable-securing loop, the strap having a catch suitable for engagement with the closure device to close and lock the clamp, the improvement comprising means for releasing the catch from the closure device including:
   interlock means formed on the strap; and
   a releasing latch connected to the base and having interlock means which mate with the interlock means of the strap when the clamp is closed so that actuation of the releasing latch moves the strap to a point where the catch disengages from the closure device, allowing the clamp to open.

2. The structure of claim 1 wherein the interlock means on the strap comprises a rib extending therefrom and the interlock means on the releasing latch comprises a groove.

3. The structure of claim 1 wherein the catch has at least two notches, on opposite sides of the catch, for engaging the closure device.

4. A releasable cable clamp comprising:
   a base having a generally flat portion and a single, upraised pedestal connected to the flat portion;
   a closure device connected to the pedestal;
   a strap connected at one end to the pedestal and extending therefrom in a generally arcuate manner to form a cable-securing loop, the other end of the strap having a catch suitable for engagement with the closure device; and
   means for releasing the catch from the closure device including, interlock means formed on the strap and a releasing latch connected to the base and having interlock means which mate with the interlock means of the strap when the clamp is closed so that actuation of the releasing latch causes the catch to be moved out of engagement with the closure device, allowing the clamp to open.

5. The structure of claim 4 wherein the interlock means found on the strap comprises a rib extending therefrom and the interlock means on the releasing latch comprises a groove.

6. The structure of claim 4 wherein the catch has at least two notches, on opposite sides of the catch, for engaging the closure device.

7. The structure of claim 4 wherein the catch is disposed such that depressing the strap will cause the catch to engage the closure device.

8. A releasable clamp comprising:
a base;
a closure device connected to the base and having first and second locking hooks;
a releasing latch connected to the closure device and having interlock means formed thereon;
a strap connected to the base and extending in a generally arcuate manner to form a cable-securing loop;
a catch formed at or near one end of the strap, the catch having first and second notches respectively engagable with the first and second locking hooks; and
interlock means on the strap which mate with the interlock means of the latch when the clamp is closed so that actuation of the releasing latch causes the strap to move in such a manner that the first notch disengages from the first locking hook, while the latch flexes the second locking hook out of engagement with the second notch, allowing the clamp to open.

9. The structure of claim 9 wherein the base includes a flat portion and a single, upraised pedestal, the closure device and strap being connected to the pedestal.

10. In a releasable cable clamp of the type having a base, a closure device connected to the base, a resilient strap connected to the base and extending in a generally arcuate manner to form a cable-securing loop, the strap having a catch suitable for engagement with the closure device to close and lock the clamp, the catch including a first locking hook and an auxiliary locking hook, the strap, catch and closure device being shaped such that opening the closure device is effective due to the resiliency of the strap to release the catch from the auxiliary locking hook only, whereas if the first locking hook is engaged in the closure device additional means for releasing the catch from the closure device are required, said means including, interlock means formed on the strap, and a releasing latch connected to the base and having interlock means which mate with the interlock means of the strap when the clamp is closed so that actuation of the releasing latch moves the strap to a point where the first locking hook disengages from the closure device, allowing the clamp to open.

11. The structure of claim 10 further characterized in that there are two auxiliary locking hooks.

* * * * *